United States Patent
Collins

[19]

[11] Patent Number: 6,135,700
[45] Date of Patent: Oct. 24, 2000

[54] TRANSPORT VEHICLE DECK LOWERING MECHANISM

[76] Inventor: Joe H. Collins, 87749 Collins La., Springfield, Oreg. 97478

[21] Appl. No.: 09/390,592

[22] Filed: Sep. 3, 1999

Related U.S. Application Data

[60] Provisional application No. 60/099,195, Sep. 4, 1998.

[51] Int. Cl.$^7$ ........................................................ B60P 1/18
[52] U.S. Cl. ........................ 414/476; 414/480; 280/43.23
[58] Field of Search ..................... 414/476, 480, 414/482, 484, 537, 495; 280/43.17, 43.23, 43

[56] References Cited

U.S. PATENT DOCUMENTS

| | | |
|---|---|---|
| 2,990,966 | 7/1961 | Schramm . |
| 3,012,682 | 12/1961 | Williamson ............................ 414/476 |
| 3,288,315 | 11/1966 | Bigden . |
| 3,335,887 | 8/1967 | Snook ..................................... 414/476 |
| 4,943,202 | 7/1990 | Galloway . |
| 5,000,645 | 3/1991 | Polojarvi . |
| 5,303,946 | 4/1994 | Youmans et al. . |
| 5,887,880 | 3/1999 | Mullican et al. ................... 414/476 X |

FOREIGN PATENT DOCUMENTS

| | | | |
|---|---|---|---|
| 2590530 | 5/1987 | France | ................................... 414/480 |

*Primary Examiner*—Frank E. Werner
*Attorney, Agent, or Firm*—Robert E. Howard

[57] ABSTRACT

A transport vehicle with a cargo deck having a deck lowering mechanism to enable easy loading of cargo, such as a motorized vehicle. The vehicle has a tandem wheel set located on each side thereof. The wheels are rotatably attached to the outer ends of spindles or stub axles, the spindles being connected at their inner ends to an adjacent walking beam. Both walking beams are pivotally connected to the lower end of an axle drop. The axle drops are connected at their upper ends to the ends of the lowering axle. The axle is rotatably attached to the frame of the cargo deck. Axle rotational means, such as hydraulic rams, are attached to the axle and, when actuated, can rotate the axle to thereby push against the axle drops and rotate them downward around their pivotal connection to their respective adjacently located walking beams. The cargo deck frame, being pivotally attached to the axle, lowers into contact with the ground as the axle drops rotate downward.

6 Claims, 4 Drawing Sheets

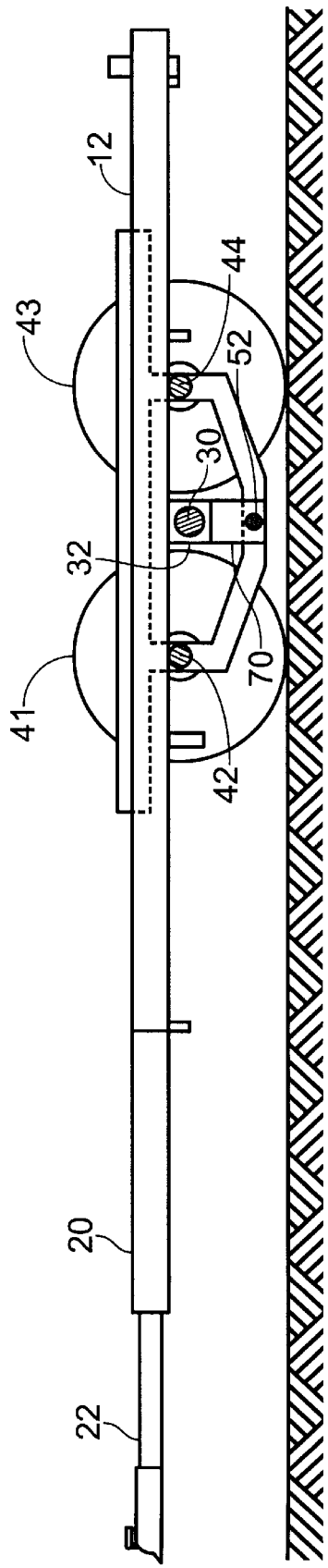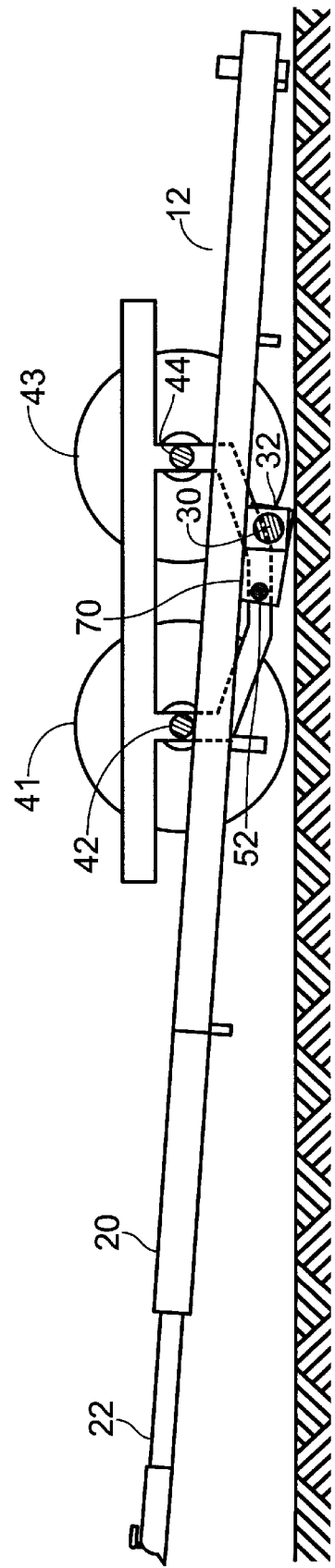

TRANSPORT VEHICLE DECK LOWERING MECHANISM

CROSS-REFERENCE TO RELATED APPLICATION

This patent application claims the benefit of U.S. Provisional Application No. 60/099,195 filed Sep. 4, 1998, the entire contents of which are hereby incorporated by reference.

BACKGROUND OF THE INVENTION

This invention relates to a mechanism for lowering the rear portion of the cargo deck of a transport vehicle to facilitate loading cargo to be transported. Such cargo includes, but is not limited to, a motorized vehicle such as an automobile, truck, boat, etc.

It is an object of this invention to provide a transport vehicle with safe, remote operation of the cargo deck that will cycle between transporting and loading positions, that has a low approach angle for loading from the rear, and has a low transport position deck height while still having sufficient transported vehicle door clearance over the cargo deck fenders where the cargo being transported is an automobile or truck.

SUMMARY OF THE INVENTION

The transport vehicle of this invention preferably comprises a trailer having (1) a cargo deck frame that is rigid from the front to the rear so that when the rear of the cargo deck is lowered to the ground the coupler attaching the trailer to a towing vehicle is the pivot point that the cargo deck pivots around, and (2) a lowering axle apparatus.

The lowering axle apparatus comprises axle to frame bearing sleeves, a rotational axle with crank ends (axle drops) pivotally attached to tandem wheel walking beams at each end of the axle, and a means to cause axle rotation.

In the transport position the axle ends are positioned substantially above the walking beam pivots. When the rotational means is applied to rotate the axle, the axle ends force the axle drops to pivot around the walking beam pivots, with the result that the axle lowers in relationship to the walking beam pivots.

As the axle turns in the axle to frame bearing sleeves the axle lowers toward the ground, thereby lowering the trailer relative to its coupler until the rear of the trailer contacts the ground. This design results in a low loading angle.

An added feature of this invention is that in the loading position the running gear tires are lifted sufficiently from the ground to accommodate tire changing without the need for jacking.

By providing the proper relationship between (1) crank (axle drop) length, (2) degrees of axle rotation, (3) height of the rear deck above the ground, (4) location of the walking beam pivots in relationship to the wheel spindles, (5) distance between the coupler and the rear end of the trailer, and (6) the distance between the coupler and the center line of the lowering axle, the height of the tandem wheel set above the cargo deck is minimized so that the doors of a vehicle being transported can be opened. This relationship is achieved by trial and error.

In the transport position low deck to ground height results in a low center of gravity and easy access and egress to the car or cargo being transported. The tire/fender height is low enough to allow the door of a small car being transported to open over the trailer tires/fenders.

With the transport vehicle of the present invention there is no need for loading ramps extending from the rear thereof to the ground for on and off loading of vehicles.

The shorter cargo deck length of the transport vehicle of the invention means that a shorter overall cargo deck length is required for a given transported vehicle wheelbase. This is very advantageous when compared to the obvious disadvantage of prior art over center tilt bed trailers as the rear tires of the vehicle being loaded must be on the rear deck area of the over center tilt deck before the front vehicle tires pass over the deck hinge area, i.e., the rear deck area must be at least as long as the wheel base of the vehicle being loaded. Also there must be enough deck area forward of the hinge point so that the vehicle being loaded can be moved forward far enough to distribute sufficient weight to the tongue coupler for safe towing.

BRIEF DESCRIPTION OF THE DRAWINGS

FIG. 2 is a side elevation view of the trailer in its raised, transportation configuration;

FIG. 3 is a side elevation view of the trailer in its lowered, loading position;

DESCRIPTION OF PREFERRED EMBODIMENTS OF THE INVENTION

Figure 1:
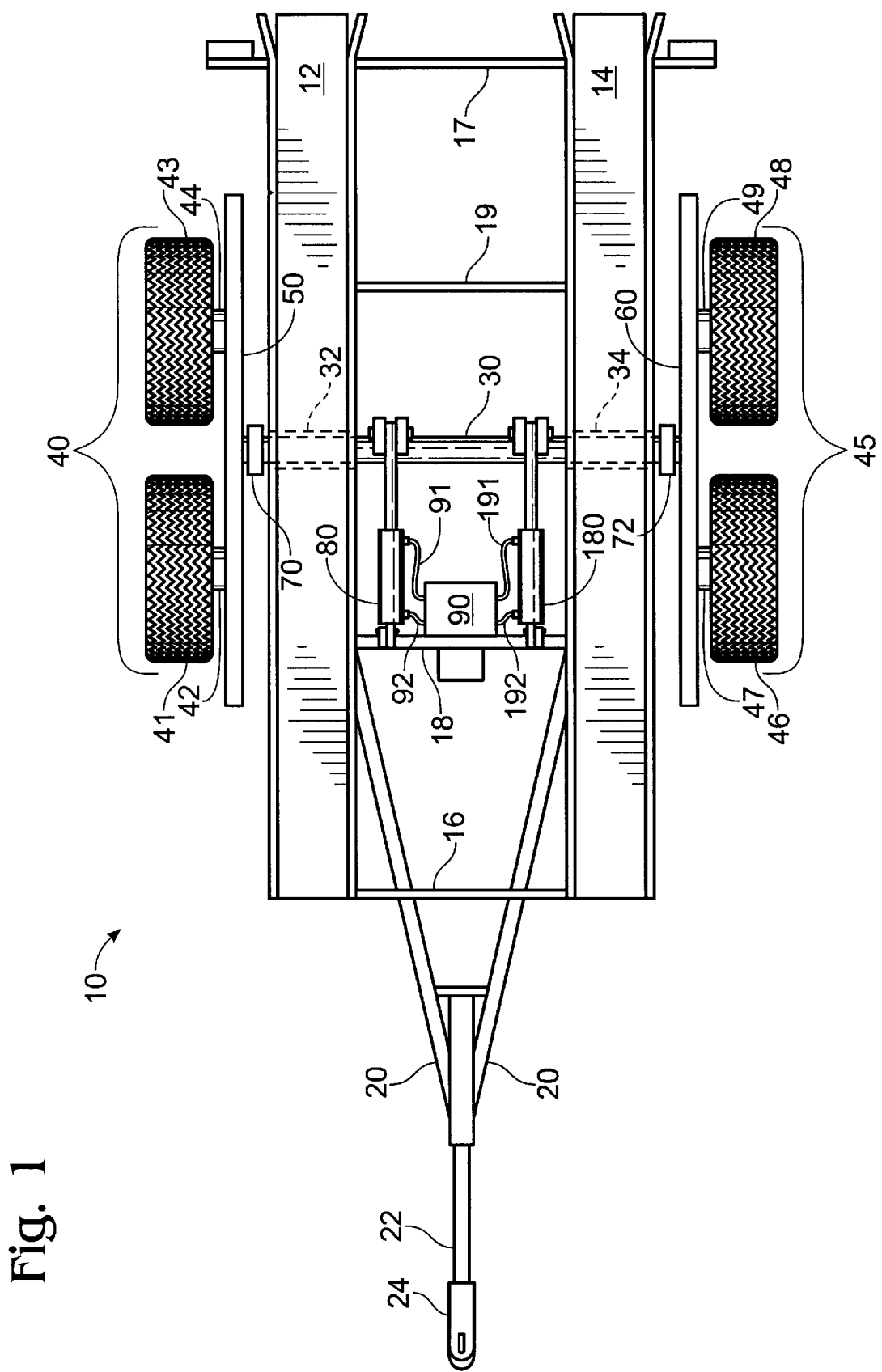
FIG. 1 is a top, plan view of the trailer of the invention.

The cargo transporting vehicle of this invention will be described relative to a trailer adapted to transport a motor vehicle such as an automobile. However, it is to be understood that the bed of the trailer can be adapted to transport other cargo where rear trailer lowering would be advantageous. Also, the invention applies to cargo transporting vehicles other than trailers, such as trucks.

Trailer 10 has a frame comprised of longitudinally extending right and left channel members or ramps 12 and 14, front cross member 16, rear cross member 17, front intermediate cross member 18 and rear intermediate cross member 19, cross members 16–19 being substantially perpendicular to ramps 12 and 14. Cross members 16–19 are fixedly attached to ramps 12 and 14, such as by bolts or welding, to form a rigid trailer frame.

Although ramps 12 and 14 can form part of the trailer frame, an alternative is to use right and left longitudinal frame members rigidly affixed to cross members 16–19 to form the trailer frame with ramps 12 and 14, or other decking, being attached to such longitudinal and cross frame members.

Ramps 12 and 14 have individual widths and spacing between them which are adapted to receive the right and left tires of a motor vehicle to be transported.

Although motor vehicle tire receiving ramps 12 and 14 are preferred as the transporting deck or bed of the trailer of this invention, other deck configurations may be used, such as a flat bed extending between the two longitudinal sides of the trailer.

V-shaped towing frame member 20 extends from the front end of trailer 10, and is suitably attached (such as by welding) to the trailer frame at an appropriate location.

Tow bar 22 is attached to V-shaped towing frame member 30 as shown. Coupler 24 of tow bar 22 is used for attaching trailer 10 to a towing vehicle, such as a truck, in a manner well known in the art.

Lowering axle 30 is rotatably attached to the underside of ramps 12 and 14 by right and left bearing assemblies 32 and 34, respectively.

Trailer 10 has right and left tandem wheel sets 40 and 45. Right tandem wheel set 40 is comprised of tires 41 and 43 and left tandem wheel set 45 is comprised of tires 46 and 48.

Tires 41, 43, 46, and 48, which are preferably pneumatic tires, are rotatably attached to the outer ends of stub axle assemblies or spindles 42, 44, 47, and 49, respectively. During movement of the trailer 10, tires 41, 43, 46, and 48 rotate about spindles 42, 44, 47, and 49.

The inner ends of spindles 42 and 44 are fixedly attached to right walking beam 50 and the inner ends of spindles 47 and 49 are fixedly attached to left walking beam 60.

The operating relationship between axle 30 and walking beam 50 will be discussed with reference to FIGS. 4–7. Although not separately illustrated, it is to be understood that the parts forming the operating relationship between axle 30 and walking beam 60 are identical to those forming the operating relationship between axle 30 and walking beam 50, although a mirror image thereof. Ramp 12 has been omitted from FIGS. 4 and 6 for sake of clarity.

With reference to walking beam 50, as shown in FIGS. 4–7, it can be seen that the lower end of an inverted axle drop 70 is pivotally attached to walking beam 50 by means of a pivot pin 52. The right outer end of axle 30 is fixedly attached to the upper end of axle drop 70, such as by welding.

Axle 30 passes through axle bearing 32 attached to the underside of right ramp 12. Adjacent the interior (left) side of right ramp 12 an axle bell crank 36 is firmly attached to the outer surface of axle 30 by welding or other means.

The cylinder of hydraulic ram 80 is pivotally attached at its rearward end to cross member 18 by means of a pivot plate 81 and pivot pin 82. The piston 83 of hydraulic ram 80 is pivotally attached at its outer end to the outer end of axle bell crank 36 by means of pivot pin 37.

Although hydraulic rams are preferred, other mechanisms for rotating axle 30 may be used in place thereof, such as pneumatic rams, electric motors and gears, etc.

Figure 4:
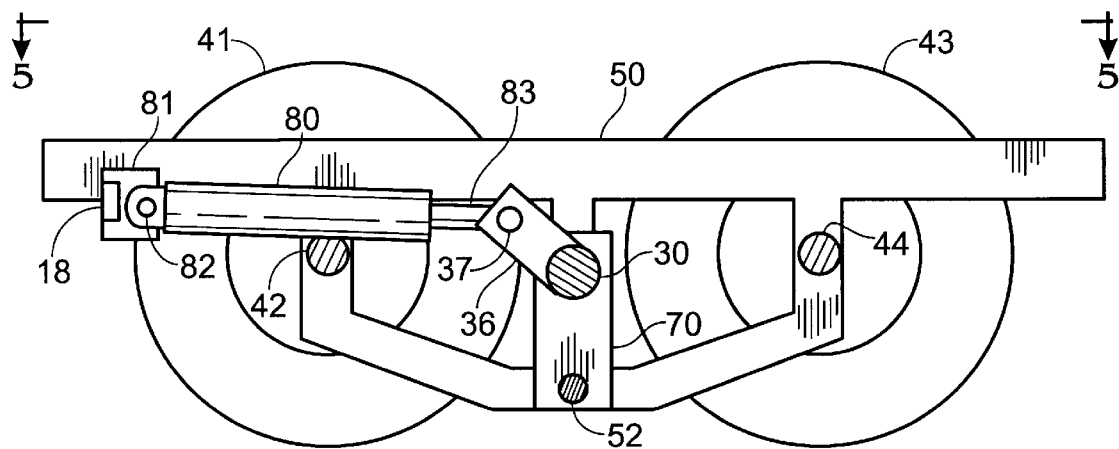
FIG. 4 is a side view of the trailer lowering mechanism in the raised, transportation configuration.
Figure 5:
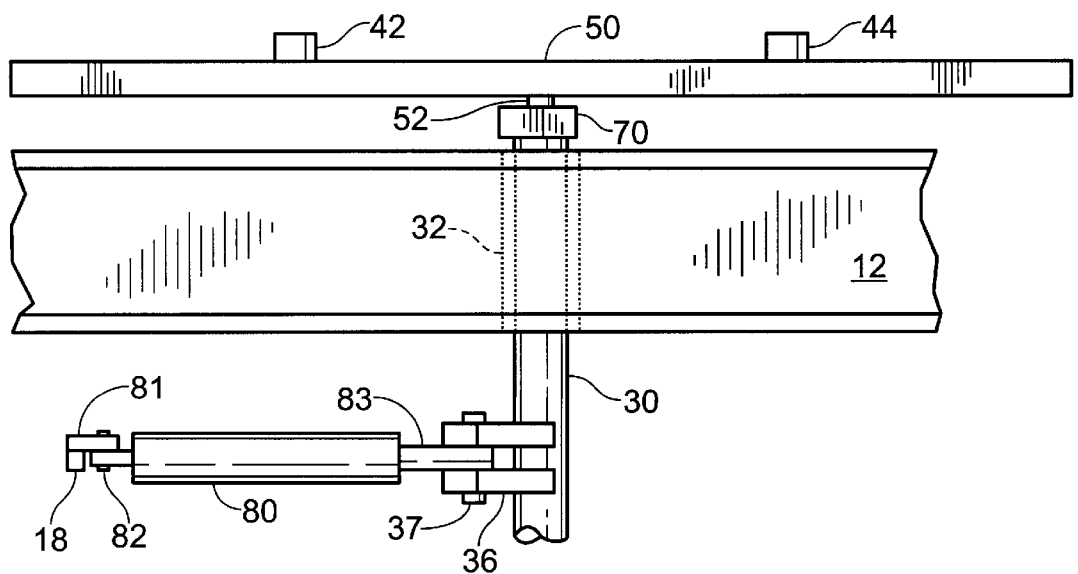
FIG. 5 is a top view of the trailer lowering mechanism taken along line 5—5 of FIG. 4.

FIGS. 4 and 5 illustrate the trailer lowering mechanism in the raised, transportation configuration of trailer 10.

Figure 6:
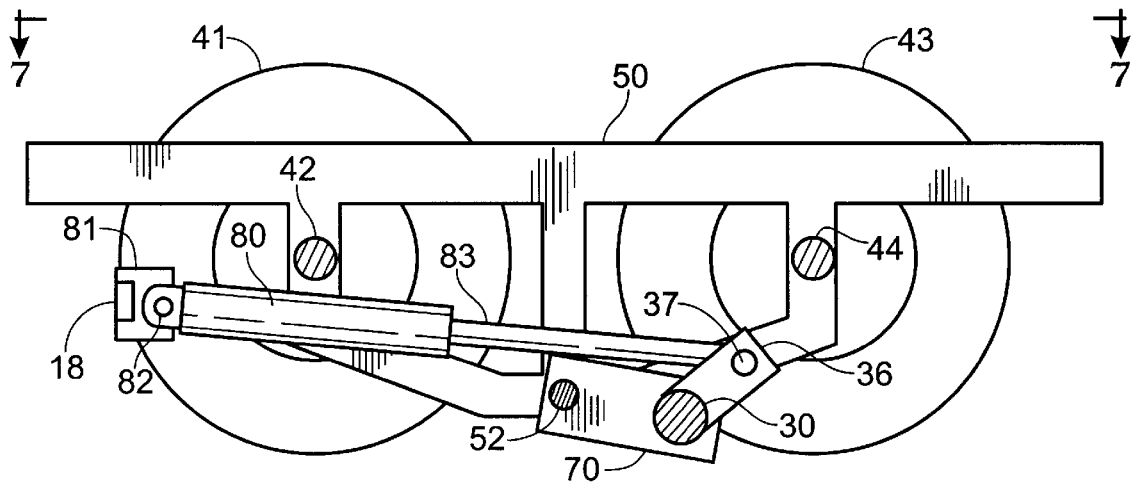
FIG. 6 is a side view of the trailer lowering mechanism in the lowered, loading configuration.
Figure 7:
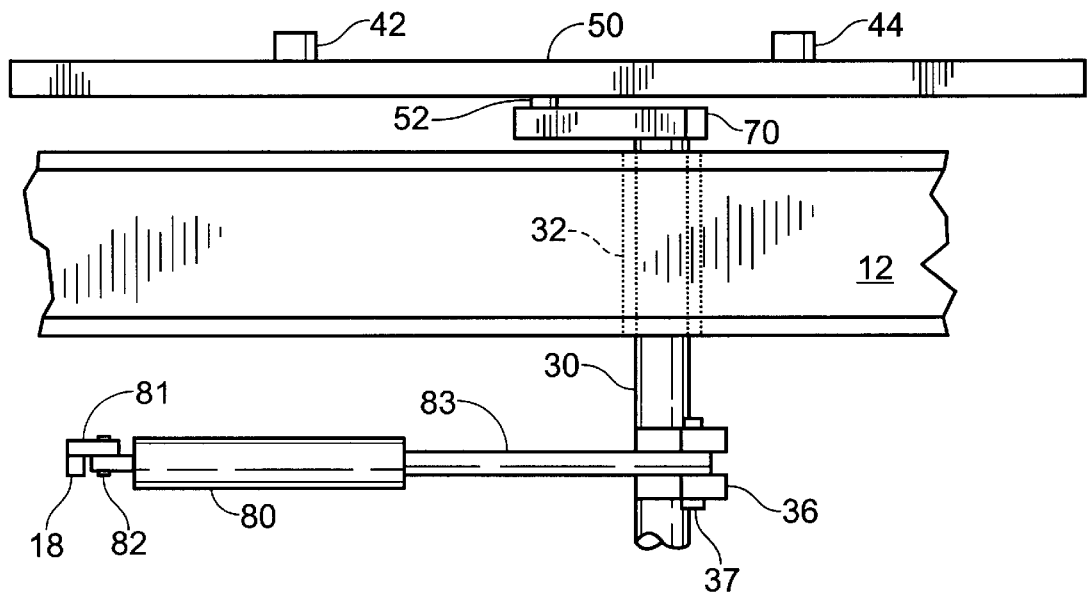
FIG. 7 is a top view of the trailer lowering mechanism taken along line 7—7 of FIG. 6.

FIGS. 6 and 7 illustrate the trailer lowering mechanism in the lowered, loading position of trailer 10. As can be seen, hydraulic ram 80 has been actuated thereby extending piston rod 83. In the lowering operation, as piston rod 83 extends, it pushes against bell crank 36 which in turn causes axle 30 to rotate clockwise (as shown). As axle 30 rotates, its right outer end causes axle drop 70 to also rotate clockwise (as shown) about walking pin pivot pin 52. As axle drop 70 rotates about pivot 52, it pushes walking beam 50 (and attached tandem wheel set 40) towards the front of the trailer 10 and at the same time lowers axle 30 (and the attached trailer frame) toward the ground. Since coupler 24 acts as a pivot point during this lowering operation, the rear part of the trailer 10 is lowered into contact with the ground.

The left side lowering mechanism operates simultaneously with the right side lowering mechanism, i.e., left side hydraulic ram 180 is actuated simultaneously with right side hydraulic ram 80, to thereby lower left ramp 14 simultaneously with right side ramp 12.

The pumps and hydraulic fluid required to operate hydraulic rams 80 and 180 are located inside container 90 which communicate with rams 80 and 180 via hydraulic lines 91, 92, 191, and 192, all in a manner well known in the art. The pumps can be manually operated or powered by suitable motors, such as an electric motor powered by a battery. The switches for actuating hydraulic rams 80 and 180 may be located at any suitable location.

FIG. 2 illustrates, schematically, the right side of trailer 10 in its raised, transportation configuration, and FIG. 3 illustrates, schematically, the right side of trailer 10 in its lowered, loading configuration.

As can be seen by reference to FIG. 3, lowering the rear end of trailer 10 to ground level causes tandem wheel sets 40 and 45 to be slightly raised off the ground, thereby providing easy access to tires 41, 43, 46, and 48 without having to use a jack.

It is preferred that the hydraulic rams 80 and 180 extend to the rear of the trailer during trailer lowering and retract toward the front of the trailer during trailer raising so that when the trailer wheel brakes are applied in transit the resulting rotational force applied to axle 30 can be restrained by appropriate axle stops (not shown). In addition, less axle rotation is required during lowering to lift the tires off the ground than would be needed with the opposite rotation.

In the preferred embodiment described, two hydraulic rams 80 and 180 are used to rotate axle 30; however, a single ram may be used.

The movement of bell cranks 36 can be limited at the end of the raising and lowering cycles by appropriate stops (not shown). A latching means that prevents axle rotation in the event of hydraulic system fluid loss during transport may also be used.

It is preferred to mount the walking beam pivots 52 substantially below the walking beam wheel spindles 42, 44, 47, and 49 to allow longer crank throws and still have a low trailer deck height. It is also preferred that the ends of axle 30 be located substantially above the respective walking beam pivots (in the transportation mode illustrated in FIG. 4), but it is to be understood that the same principle and actions will apply if the axle 30 is positioned substantially beside the walking beam pivot 52, although a longer crank throw will be required with this configuration. The latter configuration will also put more stress on both the rotational means and the latching means during transport and they will need to be strong enough to carry the load.

In addition to being useful in lowering the cargo bed of a trailer, the invention may also be used to lower the bed of a front wheel drive truck.

Although a preferred embodiment has been described, variations may be employed without departing from the spirit of the invention or the scope of the appended claims.

The invention claimed is:

1. A transport vehicle with a cargo deck comprising:
   a rigid cargo deck frame having at least two longitudinal frame members, a first of said longitudinal frame members being located adjacent a first side of said deck and a second of said longitudinal frame members being located adjacent the second side of said deck;
   a first tandem wheel set located adjacent said first side of said deck and a second tandem wheel set located adjacent said second side of said deck, each of said first and second tandem wheel sets being comprised of at least two tires, each of said tires being rotatably attached to the outer ends of wheel spindles;

a first walking beam located on said first side of said deck and a second walking beam located on said second side of said deck, the wheel spindles of said first tandem wheel set being attached to said first walking beam and the wheel spindles of said second tandem wheel set being attached to said second walking beam;

an axle extending between and beyond said first and second longitudinal frame members, said axle being rotatably attached to said trailer frame by axle bearings;

a first outer end of said axle being attached to the upper end of a first axle drop and the second outer end of said axle being attached to the upper end of a second axle drop, the lower end of said first axle drop being pivotally attached to said first walking beam by a first pivot attachment means that is located below said wheel spindles of said first tandem wheel set at their point of attachment to said first walking beam, and the lower end of said second axle drop being pivotally attached to said second walking beam by a second pivot attachment means that is located below said wheel spindles of said second tandem wheel set at their point of attachment to said second walking beam; and means for rotating said axle in one direction to lower the rearward end of said deck into contact with the ground and for rotating said axle in the other direction to raise said deck into a substantially horizontal position, said means for rotating said axle including a first axle bell crank attached at its inner end to said axle at a first location on said axle and a second axle bell crank attached at its inner end to said axle at a second location on said axle, a first linear actuator pivotally attached to said deck frame at a location forward of said axle and a second linear actuator pivotally attached to said deck frame at a location forward of said axle, the outer end of said first linear actuator being pivotally attached to the outer end of said first axle bell crank and the outer end of said second linear actuator being pivotally attached to the outer end of said second axle bell crank, said first and second linear actuators being extendable toward the rear of said vehicle during lowering of the rearward end of said deck and retractable toward the front of said vehicle during raising of the rearward end of said deck.

2. The vehicle of claim 1 wherein said linear actuators are hydraulic rams.

3. The transport vehicle of claim 2 wherein said cargo deck is located on a trailer.

4. The vehicle of claim 1 wherein after contact of the rearward end of said deck with the ground said axle and said axle drops can be rotated sufficiently further to raise said tandem wheel sets off the ground.

5. The transport vehicle of claim 4 wherein said cargo deck is located on a trailer.

6. The transport vehicle of claim 1 wherein said cargo deck is located on a trailer.

* * * * *